(12) United States Patent
Voutilainen et al.

(10) Patent No.: US 7,206,547 B2
(45) Date of Patent: Apr. 17, 2007

(54) METHOD OF TESTING ELECTRIC CIRCUIT, AND ARRANGEMENT

(75) Inventors: Juha-Veikko Voutilainen, Oulu (FI); Teuvo Saikkonen, Oulu (FI)

(73) Assignees: Elektrobit Oy, Oulu (FI); Nokia Corporation, Espoo (FI)

( * ) Notice: Subject to any disclaimer, the term of this patent is extended or adjusted under 35 U.S.C. 154(b) by 575 days.

(21) Appl. No.: 10/675,414

(22) Filed: Sep. 30, 2003

(65) Prior Publication Data
US 2005/0070269 A1 Mar. 31, 2005

(51) Int. Cl.
*H04B 17/00* (2006.01)
(52) U.S. Cl. .................... 455/67.11; 455/424
(58) Field of Classification Search ............ 455/67.11, 455/67.14, 67.7, 423, 424
See application file for complete search history.

(56) References Cited

U.S. PATENT DOCUMENTS

| | | | |
|---|---|---|---|
| 4,611,101 A * | 9/1986 | Walter et al. ............ 379/29.03 |
| 5,416,409 A | 5/1995 | Hunter | |
| 5,610,530 A | 3/1997 | Whetsel | |
| 5,887,001 A | 3/1999 | Russell | |
| 5,968,191 A | 10/1999 | Thatcher et al. | |
| 6,021,315 A * | 2/2000 | Telewski ................ 455/67.11 |

FOREIGN PATENT DOCUMENTS

FI 100829 B 4/1993

OTHER PUBLICATIONS

IEEE Std 1149.1-2001, "IEEE Standard Test Access Port and Boundary-Scan Architecture". Jun. 14, 2001.
IEEE Std 1149.4-2001, "IEEE Standard for a Mixed-Signal Test Bus", Jun. 26, 2001.

* cited by examiner

*Primary Examiner*—Quochien B. Vuong
(74) *Attorney, Agent, or Firm*—Hollingsworth & Funk, LLC (57) ABSTRACT

A method of testing an electric circuit and an arrangement for implementing the method are provided. The arrangement includes a current source connected to a network of electric components, the current source for supplying current to at least one current path of the network, the network being characterized with a predefined network configuration; a measurement unit connected to the network, the measurement unit for measuring effective values of node voltages in at least two nodes of the at least one current path, a node representing an equipotential point of adjacent electric components; and a processing unit connected to the measurement unit, the processing unit for deriving a characterizing value of at least one electric component of the network by using the effective value of current, the effective values of the node voltages, and the predefined network configuration.

27 Claims, 4 Drawing Sheets

METHOD OF TESTING ELECTRIC CIRCUIT, AND ARRANGEMENT

FIELD

The invention relates to a method of testing an electric circuit and to an arrangement. In particular, the invention relates to a method and an arrangement applied to an electric circuit of a wireless device of a telecommunications system.

BACKGROUND

Reliable, accurate, fast and cost-efficient testing of products is one of the corner stones of the modern electronics industry producing electronic devices, such as wireless devices of telecommunications systems, in mass production.

The electronic circuits to be tested usually form a network of electric components, such as resistors and capacitors. In order to investigate the characteristics of such a network, a test stimulus is fed into the network, and the phase and amplitude of the voltage across the electric components being tested are monitored.

Phase and amplitude measurements, however, require a relatively complex and expensive testing instrumentation. Therefore, it is desirable to consider improved techniques for testing electric circuits of wireless devices.

BRIEF DESCRIPTIONS OF THE INVENTION

An object of the invention is to provide an improved method and an arrangement implementing the method. According to an aspect of the invention, there is provided a method of testing an electric circuit of a wireless device of a telecommunications system, the method including: supplying current to at least one current path of a network of electric components, the network being characterized with a predefined network configuration; measuring effective values of node voltages in at least two nodes of the at least one current path, a node representing an equipotential point of adjacent electric components; and deriving a characterizing value of at least one electric component of the network by using the effective value of the current, the effective values of the node voltages, and the predefined network configuration.

According to a second aspect of the invention, there is provided an arrangement for testing an electric circuit of a wireless device of a telecommunications system, comprising: a current source connected to a network of electric components, the current source for supplying current to at least one current path of the network, the network being characterized with a predefined network configuration; a measurement unit connected to the network, the measurement unit for measuring effective values of node voltages in at least two nodes of the at least one current path, a node representing an equipotential point of adjacent electric components; and a processing unit connected to the measurement unit, the processing unit for deriving a characterizing value of at least one electric component of the network by using the effective value of the current, the effective values of the node voltages, and the predefined network configuration.

According to yet another aspect of the invention, there is provided an arrangement for testing an electric circuit of a wireless device of a telecommunications system, comprising: means connected to a network of electric components, the means for supplying current to at least one current path of the network, the network being characterized with a predefined network configuration; means connected to the network, the means for measuring effective values of node voltages in at least two nodes of the at least one current path, a node representing an equipotential point of adjacent electric components, and means connected to the means for measuring, the means for deriving a characterizing value of at least one electric component of the network by using the value of the current, the effective values of the node voltages, and the predefined network configuration.

Preferred embodiments of the invention are described in the dependent claims.

The method and system of the invention provide several advantages. The use of effective node voltages and a priori information on the network characteristics in deriving the characteristic values of the electric components simplifies the measurement since the relative phase of the current and voltage in the current path is not needed. This simplifies the test instrumentation and thus, reduces the costs of testing.

LIST OF DRAWINGS

In the following, the invention will be described in greater detail with reference to the preferred embodiments and the accompanying drawings, in which.

DESCRIPTION OF EMBODIMENTS

Figure 1:
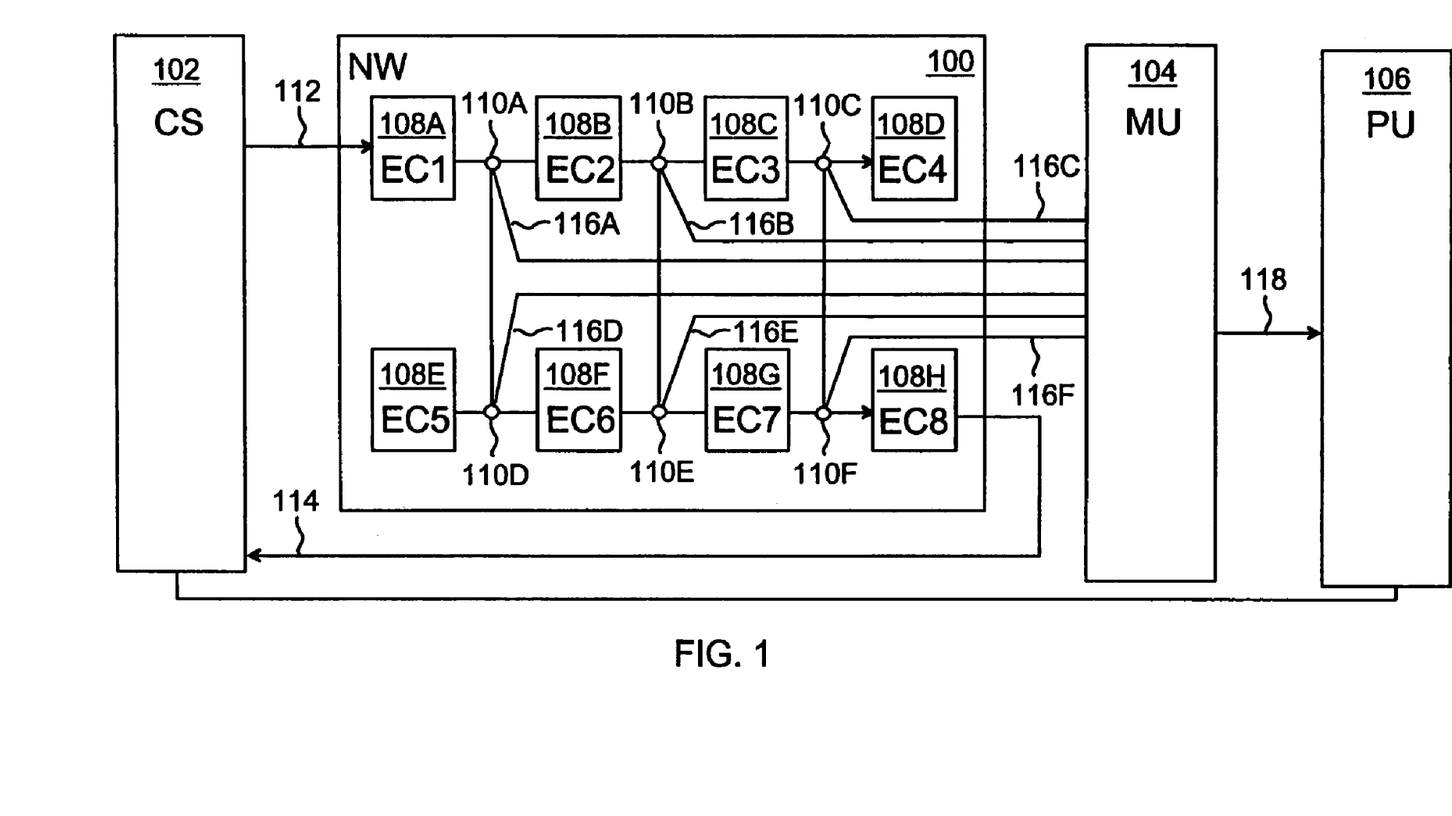
FIG. 1 shows a first example of the arrangement according to embodiments of the invention.

FIG. 1 shows a network (NW) 100 of electric components (EC1 to ECH) 108A, 108B, 108C, 108D, 108E, 108F, 108G, 108H, a current source (CS) 102 connected to the network 100, a measurement unit (MU) 104 connected to the network 100, and a processing unit (PU) 106 connected to the measurement unit 104.

The testing arrangement and the method may be applied for testing a wireless device of a telecommunications system, such as GSM (Global System for Mobile Communications) and UMTS (Universal Mobile Telecommunications System). The invention is not, however, restricted to those systems, but may be applied to any telecommunications system.

In testing, the wireless device is typically subjected to a test procedure, which typically results in a test result. The test results may be used in assessing the quality of the wireless device and possibly the rejection of the wireless device from entering the market. The test result may also be used in calibration, tuning, and maintaining the wireless device. Thus, the term "testing" may cover production testing, calibration, tuning, and maintenance testing.

The wireless device may also be called terminal equipment, user equipment, a cellular phone, a mobile phone, a mobile terminal, and mobile equipment, for example. In a broad sense, the wireless device is a piece of equipment capable of communicating with a communication network of a telecommunications system by using a radio frequency air interface. The structure of the wireless device is known to a person skilled in the art, and in this context, only details relevant to the present solution are described.

The electric circuit to be tested may be a portion of a printed board, a component on a circuit board, or a portion of an integrated circuit. The present solution is not, however, restricted to the aforementioned circuits, but may be applied to any electric circuit used in a wireless device.

The exemplified network 100 includes at least two electric components 108A to 108H. In the exemplified network 100, the interconnections between the electric components 108A to 108H are shown in order to illustrate the complexity of the network, and the connections may vary depending on the network configuration. The number of the electric components 108A to 108H in the network 100 may be arbitrary.

The network 100 is characterized by a predefined network configuration. The predefined network configuration typically determines the relative positions of the electric components 108A to 108H and the primitive characteristics of the electric components 108A to 108H. The primitive characteristics define, for example, the type of the electric component 108A to 108H, i.e. whether the electric component 108A to 108H has resistive, capacitive, or inductive characteristics. The primitive characteristics may further include an a priori estimate for the characteristic value of the electric component 108A to 108H.

The predefined configuration may be used for determining current-voltage relations in the electric circuit. The relations may be used for deriving the characterizing value of an electric component 108A to 108H.

An electric component 108A to 108H typically includes an element characterized by an electric response, such as a voltage drop between the input and output connectors of the element, to the current between the connectors. In an embodiment, the impedance of the electric component 108A to 108H depends on the frequency of the current. In such a case, the current supplied by the current source 102 may be alternating current. In an embodiment, the current source 102 may be a function generator.

An electric component 108A to 108H may be placed on an integrated circuit, which is tested with the test arrangement. An electric component 108A to 108H may also be a virtual electric component located in the current source 102 or in the measurement unit 104. In such a case, the virtual electric component may characterize internal characteristics, such as internal resistance or a related electric property, of the current source 102 and/or in the measurement unit 104.

The characterizing value of an electric component 108A to 108H is typically a physical quantity characterizing the response of the electric component 108A to 108B to the current. In an embodiment, the characterizing value is a point in the characterizing I/U curve, wherein U is the voltage and I is the current.

In an embodiment, the electric component 108A to 108H is a discrete component, such as a resistor, capacitor, coil or their combination. The corresponding characterizing value characterizes resistance, capacitance, inductance, conductance, or in general, impedance of the electric component 108A to 108H.

The electric components 108A to 108H form current paths in the network 100. A current path includes at least one electric component 108A to 108H, through which electric current is passed. In an embodiment, a current path includes a plurality of electric components 108A to 108H, which form a chain-like structure. An electric component 108A to 108H may be part of a single current path only. An electric component 108A to 108H may also belong to several current paths.

With reference to FIG. 1, an exemplified first current path may be composed of electric components 108A, 108B, 108C and 108H. A second exemplified current path may be composed of electric components 108A, 108E, 108G and 108H. The first and the second current paths may be realized, for example, if the network 100 is connected to the current source 102 and the measurement unit 104 in the manner shown in FIG. 1. In an embodiment, current is supplied to a plurality of current paths, and the effective values of the node voltages are measured in nodes of the plurality of current paths. The characterizing values of the electric components 108A to 108H may result from the plurality of the measurements.

The exemplified network 100 includes nodes 110A, 110B, 110C, 110D, 110E, 110F. A node 110A to 110F represents an equipotential point between at least two adjacent electric components 108A to 108H. An equipotential point is typically a low-ohmic junction between two electric components 108A to 108H. A node 110A to 110F may also be associated with more than two adjacent electric components 108A to 108H. In this context, the electric characteristics, such as resistance, of the interconnections may be included into the characteristics of the electric components 108A to 108H.

In an embodiment, a node 110A to 110F is located between an electric component 108A to 108H and the current source 102. In such a case, a node voltage of the electric component 108A to 108H may have the same value as the voltage of the output connector of the current source 102.

The nodes 110A to 110F provide access points for measuring effective voltages across the electric components 108A to 108H. An effective voltage measured from a node 110A to 110F is an effective node voltage 116A, 116B, 116C, 116D, 116E, 116F. An effective node voltage 116A to 116F may be a potential difference between a potential measured from the node 110A to 110F and a reference potential. The node voltages 116A to 116F may be determined by using several reference potentials for different nodes 110A to 110F. In this case, however, the potential difference between the reference potentials may be used to return the measured node potentials to node voltages 116A to 116F.

The current source 102 is connected to the network 102 and may supply current 112 to a current path. The current results in node voltages 116A to 116F in the nodes 110A to 110F. The output current 114 from the network may be connected to the current source 102 or to an analog ground. The node voltages 116A to 116F may vary in time. In an embodiment, the value of current 112 supplied by the current source 102 is the same as the output current 114 from the network.

The measurement unit 104 is connected to the network 102 and measures effective values for the node voltages 116A to 116F. The measurement unit 104 provides the effective values of the node voltages 116A to 116F and/or information 118 on the effective values to the processing unit 106. The measurement unit 104 may be for example, a voltmeter.

The processing unit 106 may derive a characterizing value for at least one electric component 108A to 108H by using the effective value of the node voltages, the effective value of the current, and the predefined network configuration.

The effective value of the current 112 may be predefined in the processing unit 106. In such a case, the current 112 supplied by the current source 102 may be regulated such that the value of the current 112 remains within predetermined limits.

In an embodiment, the measurement unit 104 may measure the effective values of node voltages 116A to 116F of an electric component 108A to 108H, which has a known characterizing value, and the processing unit 106 derives the value of current by using the effective values of the node voltages associated with the electric component 108A to 108H, which has the known characterizing value, the known characterizing value. For example, if the electric characteristics, such as resistance, of the electric component 108B are known, the current 112 in the current path the electric component 108B belongs to may be derived by using the effective values of the node voltages 116A and 116B measured from nodes 110A and 110B, respectively, the characterizing value, i.e. the resistance value of the electric component 108B, and Ohm's law. In this case, the electric component may be called a sense resistor. The current obtained in this way represents the current going through all the electric components in this specific current path. The known characterising value may be stored in the processing unit 106.

It is also possible, that the current source 102 reports the applied current value to the processing unit 106. The effective value of the current 112 may also be calculated in the processing unit 106.

Figure 2:
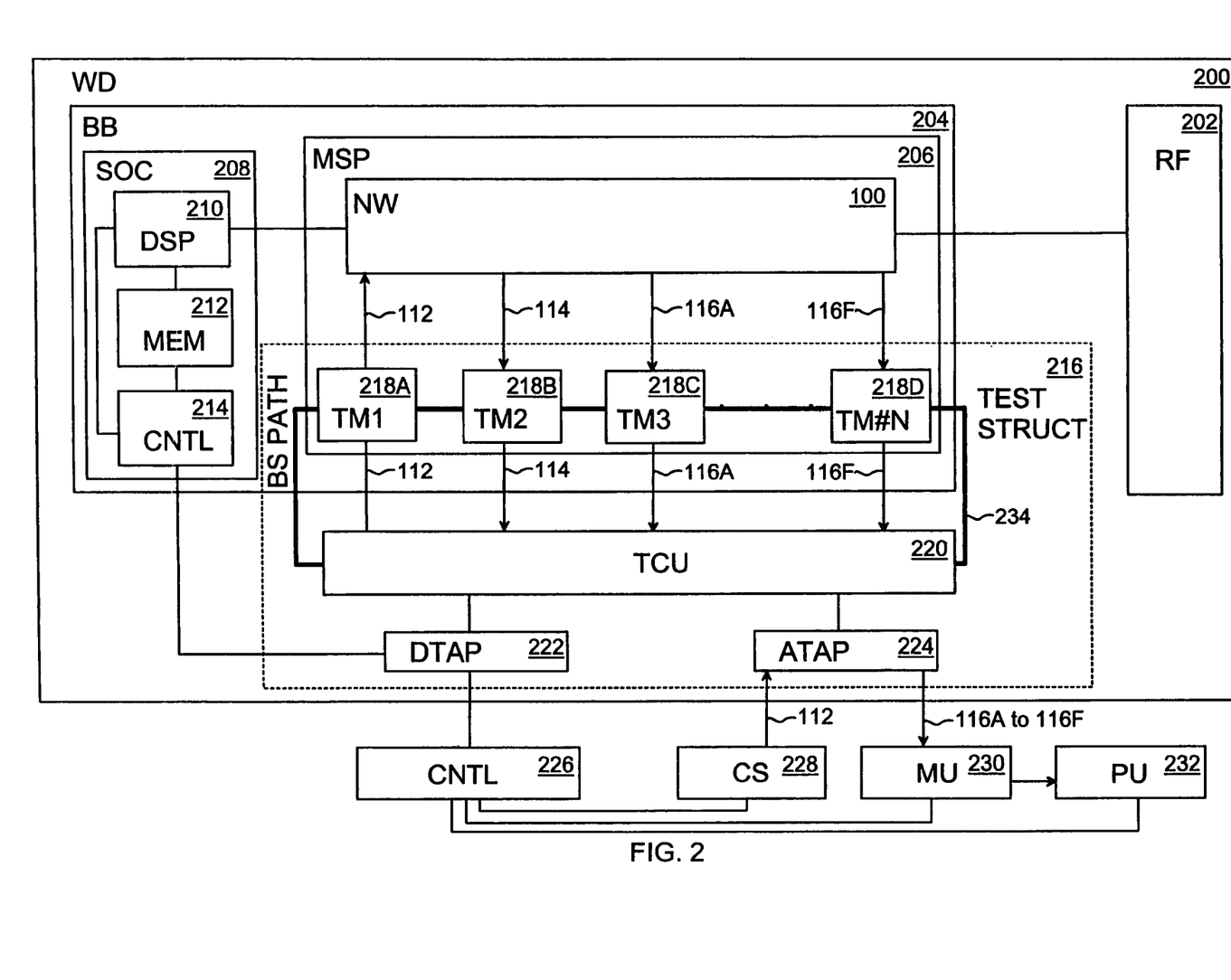
FIG. 2 shows a second example of the arrangement according to embodiments of the invention.

With reference to FIG. 2, an exemplified wireless device (WD) 200 may include a radio frequency (RF) part 202 and a base band part (BB) 204. The RF part 202 may include an antenna unit for performing a conversion between an electric antenna signal and an electromagnetic field carrying the radio frequency signals between the wireless device 200 and the communication network.

The RF part 202 typically includes functionalities associated with radio frequency signals. However, the RF part 202 may deal with signals, such as control signals, oscillating at low frequencies.

The RF part 202 may include functional entities including networks 100 of electric components 108A to 108H, which may be tested according to the invention. A phase locked loop and voltage controlled oscillators may be considered as examples. It is known to one skilled in the art how to apply the present invention to such functional entities.

A portion of the RF part 202 may be implemented with a radio frequency integrated circuit, such as RF ASIC (Application Specific Integrated Circuit).

The base band part 204 may include a mixed signal part (MSP) 206 and a system-on-chip (SOC) 208. The mixed signal part 206 may perform tasks both in the digital and the analog domain.

The system-on-chip 208 may be implemented with a digital signal processor (DSP) 210 and memory device 212, such as ROM (Read-Only-Memory). The structure and operation of the digital signal processor 210 and those of the memory device 212 are known to one skilled in the art, and only details relevant to the invention are disclosed.

In the exemplified wireless device 200, the network 100 is located in the mixed signal part 206. However, the location of the network 100 is not restricted to the mixed signal part 206, but may be located anywhere in the wireless device 100, where such a network is required.

With further reference to FIG. 2, the test arrangement may include a test structure 216 connected to the network 100 for providing access to the network 100. The test structure 216 typically enables input and output traffic between the network 100 and the external devices, such as the current source 228 and the measurement unit 230. The test structure may be based on, for example, a boundary scan test architecture, such as that defined by standard IEEE 1149.4, "Standard for a Mixed Signal Test Bus", IEEE, USA, 1999, which is thereby incorporated by reference.

Exemplified test structure 216 may include test modules (TM1 to TM#N)) 218A, 218B, 218C, 218D for providing connection between the network 100 and a test control unit 220. The number of test modules 218A to 218D may be chosen freely depending on the embodiment and possibly the complexity of the network 100.

In an embodiment, at least a portion of the network 100 and at least a portion of the test structure 200 are placed on one and the same integrated circuit. For example, some of the test modules 218A to 218D may be placed on the same integrated circuit as the electric components 108A to 108H.

The test modules 218A to 218D may be controlled by a test control unit 220, by using a boundary scan path 234, for example. The control includes, for example, switching a desired test module 218A to 218D to a desired analog test access port (ATAP) 224.

In an embodiment of the invention, the test structure 200 may be connected to the measurement unit 230, and the test structure 200 may be configured to access nodes 110A to 110F of the at least one current path in order to measure the effective values of the node voltages 116A to 116F. In the exemplified case shown In FIG. 2, the nodes 110A to 110F are accessed by test modules 218C, 218D. The test control unit 220 may connect the test modules 218C, 218D to a pin of an analog test access port 224, which pin is further connected to the measurement unit 230.

In an embodiment of the invention, the test structure 200 may be connected to the current source 228, and the test structure 200 may be configured to access the network 100 in order to supply current 112 to the at least one current path. In the exemplified case shown in FIG. 2, current 112 is supplied by the test module 218A, and the current circuit is closed by the test module 218B. The output current 114 may also be conducted to an analog ground via the test module 218B, for example, and a connection to the current source 228 is not necessarily required. The test control unit 220 may connect the test modules 218A, 218B to a pin of an analog test access port 224, which is further connected to the current source 228.

The test arrangement may further include a test controller 226. The test controller 226 may control the current source 228 to supply current 112 at a desired value and at a desired time instant. The test controller 226 may be connected to a digital test access port (DTAP) 222 of the standardized boundary scan test structure 216.

The test controller 226 may control the measurement unit 230 to perform a measurement at a desired voltage range at a desired time instant.

The test controller may control the processing unit 232 to derive the characterizing value of the electric component by using a desired network configuration. The test controller 226 may provide, for example, information for implementing a desired mathematical formula characterizing a value of an electric component.

The test controller 226 may provide routing and switching information for the test control unit 220 so that the test control unit 220 performs routing of the current 112 from a desired pin of the analog test access port 224 to a desired test module 218A to 218D. Furthermore, the routing and switching information may configure the test structure 216 to perform a voltage probing by a desired test module 218A to 218D and to connect the test modules 218A to 218D to a desired pin of the analog test access port 224.

The wireless device may include an internal test controller 214 for performing some of the tasks of the test controller 226. The internal test controller 214 may be connected to the digital test access port 222.

In an embodiment, the measurement unit 230 is located in the wireless device 200.

In an embodiment, the current source 228 is located in the wireless device 200.

In an embodiment, the processing unit is located in the wireless device 200. In such a case, the processing unit 232 may be implemented in the internal test controller 214, for example.

If the measurement unit 230, the current source, and the processing unit are located in the wireless device 200, the wireless device 200 may be capable of performing a build-in-self testing (BIST).

Figure 3:
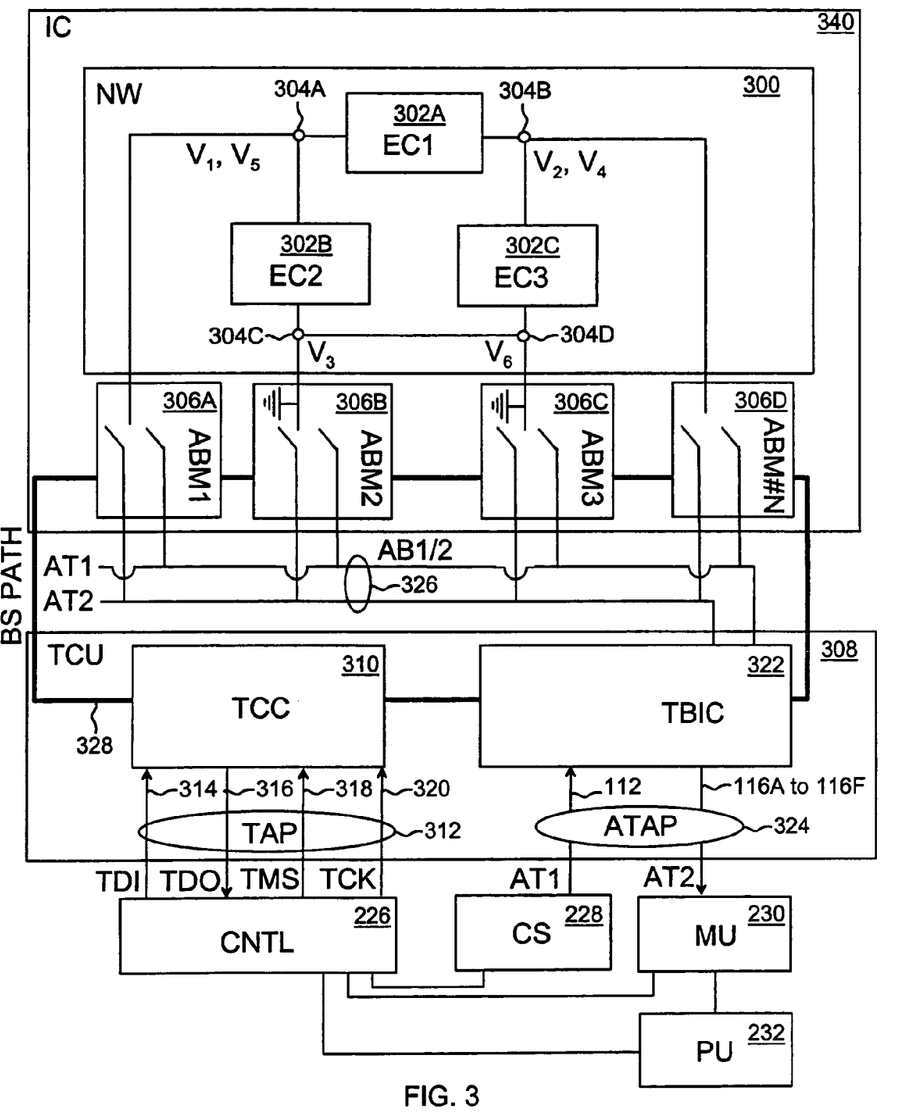
FIG. 3 shows a third example of the arrangement according to embodiments of the invention.

FIG. 3 shows an exemplified network 300 of electric components 302A, 302B, 302C. The electric components 302A, 302B, 302C form a delta configuration. In the example of FIG. 3, the standardized test structure includes analog boundary modules (ABM1 to ABM#N) 306A, 306B, 306C, 306D, and a test control unit 308. The detailed structure of an analog boundary module is described the IEEE 1149.4 standard.

The network 300 may be located on an integrated circuit 340. The analog boundary modules 306A to 306D may also be located on the same integrated circuit 340.

The exemplified test control unit 308 may include test control circuitry 310, which may include a test access port controller, instruction register, and a decoder now shown in FIG. 3. The test control circuitry 310 is connected to a test access port 312 and provides digital access from external test devices to the analog boundary modules 306A to 306D.

The test control circuitry 310 may receive a digital test data signal 314, a digital test mode select signal 318, and a test clock signal 320, communicated through a test data input pin (TDI), a test mode select (TMS) pin, and a test clock (TCK) pin, respectively, connected to the test controller 226, for example.

The test control circuitry 310 may output a digital test data output signal 316 communicated through a test data output (TDO) pin connected to the test controller 226, for example. The detailed structure and the associated data protocols of the test control circuitry 310 are found in standard IEEE 1149.1 "IEEE Standard Test Access Port and Boundary Scan Architecture", IEEE USA 2001, which is thereby incorporated by reference.

The exemplified test control unit 308 may include a test bus interface circuit 322, which provides an analog access to the analog boundary modules 306A to 306D. The test bus interface circuit 322 may be equipped with an analog test access port (ATAP) 324 which includes a first analog test pin (AT1) and a second analog test pin (AT2) for relaying analog signals between the test bus interface circuit 322 and device, such as the current source 228 and the measurement unit 230.

The test control unit 308 may communicate with the analog boundary modules 306A to 306D through the boundary scan path 328. The test control unit 308 may send a control word to the boundary scan path 328, which control word configures a desired analog boundary module 306A to 306D to switch to a node 304A to 304D, thus connecting the node 304A to 304D to the current source 228 or to the measurement unit 230. The test control word may be inputted into the test data input pin, for example.

The test bus interface circuit 322 may be connected to an analog boundary module 306A to 306D through an internal analog test bus (AB1/2) 326. The test bus interface circuit 322 may connect the internal analog test bus 326 to the analog test access port 324, thus providing a connection from the pins AT1 and AT2 of the analog test access port 324 to the analog boundary module 306A to 306D.

With reference to FIG. 3, let us consider the principles of determining characterizing values of electric components 302A to 302C. The measurement of the effective values of the node voltages may be conducted in two steps.

In the first step, current with effective value $I_1$ is supplied to node 304A and the analog ground in the analog boundary modules 306B provide a sink for the current 112. In the meantime, node 304D is kept isolated from the analog boundary module 306C. Nodes 304A, 304B, and 304C are probed by the analog boundary modules 306A, 306D and 306B, respectively. The resulting node voltages are conducted through the test control unit 308 to the measurement unit 230, wherein the effective values of the node voltages denoted $V_1$, $V_2$, and $V_3$, respectively, are determined.

In the second step, current with effective value $I_2$ is supplied to the node 304B by the analog boundary module 306D. The current sink may be provided by the analog ground in the analog boundary module 306C. In this step, node 304A is kept isolated. Nodes 304A, 304B, and 304D are probed by the analog boundary modules 306A, 306D and 306C, respectively. The resulting node voltages are conducted through the test control unit 308 to the measurement unit 230, wherein the effective values of the node voltages denoted $V_5$, $V_4$, and $V_6$, respectively, are determined.

The measurement unit 230 may output the effective values of the node voltages to the processing unit 232, which derives the characterizing values of the electric components 302A to 302C.

In an embodiment, the derivation is performed by calculating the characterizing values with a closed-form mathematical expression formed according to the predefined network configuration. The mathematical expression may be obtained, for example, by using known voltage-current relationships, such as Kirchoff's current and voltage laws, of electric circuits.

If the electric components are resistive components in the exemplified delta configuration, the following formulae may be written for the resistance values:

$$R_1 = \frac{(V_1 - V_2)}{V_2 - V_3} \quad R_3 = \frac{(V_4 - V_5)}{V_5 - V_6} R_2, \tag{1}$$

$$R_2 = \frac{(V_1 - V_3)(V_4 - V_6) - (V_2 - V_3)(V_5 - V_6)}{(V_4 - V_6)I_1 - (V_2 - V_3)I_2}, \text{ and} \tag{2}$$

$$R_3 = \frac{(V_1 - V_3)(V_4 - V_6) - (V_2 - V_3)(V_5 - V_6)}{(V_1 - V_3)I_2 - (V_5 - V_6)I_1}, \tag{3}$$

wherein $R_1$, $R_2$, and $R_3$ are the values of resistance of the electric components 302A, 302B, and 302C, respectively. The current values $I_1$ and $I_2$ may be provided by the current source 228 or the test controller 226, for example. It is also possible that the current values $I_1$ and $I_2$ are obtained by performing a voltage measurement across an electric component with a known characterizing value.

Equations (1) to (3) suggest that the values of $R_2$ and $R_3$ are required prior calculating the value for $R_1$. It is noted, that there may be several equivalent sets of equations, which provide similar results $R_1$, $R_2$, and $R_3$. Therefore, the order of the calculation depends on the details in the formulation.

A characterizing value X of an electric component may be expressed in generic form as $$X = X(V_1, V_2, \ldots, V_M, I), \tag{4}$$

wherein $V_1, \ldots, V_M$ are the effective node voltages, and $f$ is a frequency of the current.

Figure 4:
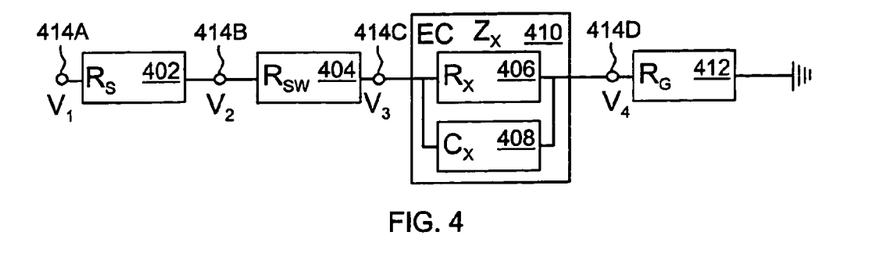
FIG. 4 shows an example of a current path.

With reference to FIG. 4, an exemplified current path may include a sense resistor 402 with resistance value $R_S$, a switch resistor 404 with resistance value $R_{SW}$, an electric component (EC) 410 with impedance value $Z_x$, and a ground resistor 412 with resistance value $R_G$.

The current may be supplied to node 414A by using an analog boundary module 306A to 306D.

Nodes 414A, 414B, 414C, 414D may be accessed with analog boundary modules 306A to 306D in order to measure the effective values of the node voltages $V_1$, $V_2$, $V_3$, and $V_4$, respectively.

The value of resistance $R_s$ of the sense resistor 402 is known, and therefore, the sense resistor 402 corresponds to an electric component with known characterizing value.

The switch resistor 404 characterizes resistive characteristics of the analog boundary modules 306A to 306D, for example, when the analog boundary modules 306A to 306D are used in supplying current into the current path. Because the same current goes through the components 402, 404, 410 and 412, the ratio between the voltage across the sense resistor 402 and the voltage across the electric component 410 is unaffected by the value $R_{SW}$ of the resistance of the switch resistor 404. The value of resistance $R_{SW}$ affects on the measurements only in the case, where it is several magnitudes higher than the values of the resistances $R_s$ and $Z_x$. In this case, the voltages across the components 402 and 410 are so small that the limited resolution of the voltage measurement decreases the accuracy of the component value determination. This special case is left out from the consideration in the exemplary case.

The ground resistor 412 represents the resistance between the electric component 410 and the ground, such as that shown in the analog boundary module 306B. If the resistance of the ground resistor 412 is negligible compared with the value of the real part $Z_R$ of the impedance $Z_x$ of the electric component 410, or if the sum of the value of the resistance of the ground resistor 412 and the value of the real part $Z_R$ of the impedance $Z_x$ is negligible compared with the imaginary part $Z_C$ of the impedance $Z_X$, the voltage $V_4$ across the ground resistor 412 may be left out from the consideration. In this example, the voltage $V_4$ across the ground resistor 412 is neglected, and therefore, the voltage across the electric component 410 equals $V_3$.

The exemplified electric component 410 includes a resistor 406 and a capacitor 408 in parallel connection. The impedance of the electric component 410 may be expressed as $$Z_x = \frac{R_S}{\sqrt{1+(\omega R_x C_x)^2}} A, \tag{5}$$

wherein $\omega = 2\pi f$, and $A = \arctan(-\omega R_x C_x)$. The frequency of the current is denoted $f$.

In terms of effective values of node voltages $V_1$, $V_2$, $V_3$, and $V_4$, the impedance $Z_x$ may be shown to obey the formula $$Z_x = \frac{R_s}{\sqrt{\left(\frac{V_1}{V_3}\right)^2 - \sin^2 A} - \sqrt{\left(\frac{V_2}{V_3}\right)^2 - \sin^2 A}}. \tag{6}$$

The capacitance value $C_x$ may be obtained from Equation (5), thus yielding $$C_x = \frac{\sqrt{\frac{1}{Z_x^2} - \frac{1}{R_x^2}}}{\omega}. \tag{7}$$

By substituting $Z_x$ from Equation (6) into Equation (7) we get $$C_x = \frac{\sqrt{\frac{\left(\sqrt{\left(\frac{V_1}{V_3}\right)^2 - \sin^2 A} - \sqrt{\left(\frac{V_2}{V_3}\right)^2 - \sin^2 A}\right)^2}{R_s^2} - \frac{1}{R_x^2}}}{\omega}. \tag{8}$$

Determination of components of $Z_x$, i.e. $C_x$ and $R_x$ can be performed in two steps. In the first step, the resistance value $R_X$ is determined with DC (direct current) measurement. In the direct current measurement, direct current is supplied to the current path, and the resistance $R_x$ may be obtained from relation $$R_x = \frac{V_3 - V_4}{V_2 - V_1} R_s \tag{9}$$

In the second step, alternating current may be supplied to the current path, and the effective values of $V_1$, $V_2$, and $V_3$ are measured. The effective values of $V_1$, $V_2$, and $V_3$, the angular frequency $\omega$, and the value of $R_x$ may be substituted into Equation (8). The value of $A = \arctan(-\omega R_x C_x)$ may be calculated by using a priori information of the capacitance $C_x$.

Figure 5:
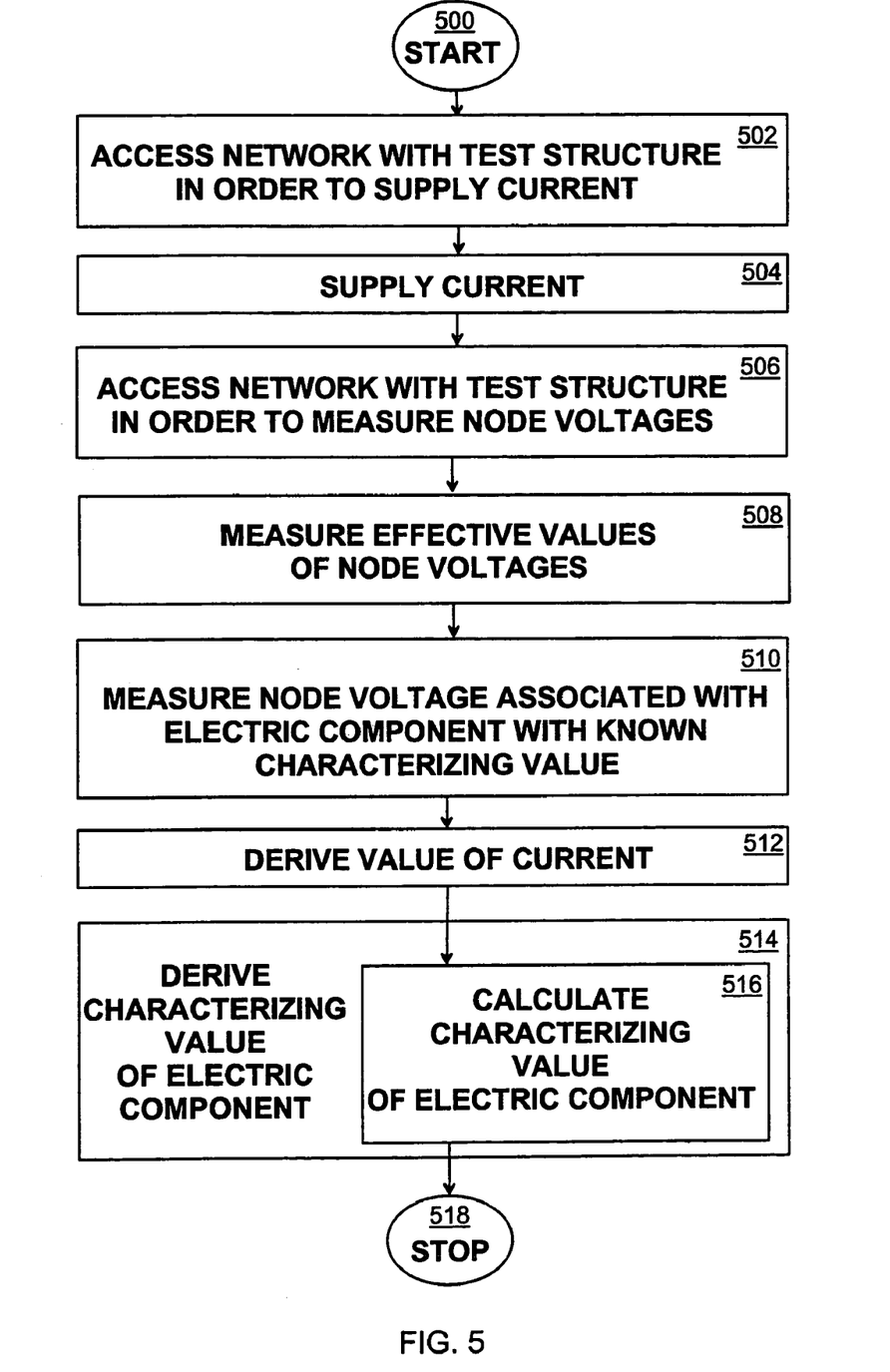
FIG. 5 shows methodology used by the arrangement according to embodiments of the invention

With reference to FIG. 5, embodiments of the methodology of the invention are shown with a flow chart presentation.

In 500, the method is started.

In 502, the network 100 is accessed with a standardized boundary scan test structure 216 in order to supply current 112 to the at least one current path.

In 504, current is supplied to at least one current path of the network 100 of electric components, the network 100 being characterized with a predefined network configuration.

In 506, the network 100 is accessed with a standardized boundary scan test structure 216 in order to measure the node voltages.

In 508, the effective values of the node voltages are measured in at least two nodes of the at least one current path.

In 510, the effective values of the node voltages of an electric component, which has a known characterizing value, are measured.

In 512, the value of current is derived by using the effective values of the node voltages of the electric component, which has the known characterizing value, and the known characterizing value.

In 514, the characterizing value of at least one electric component of the network is derived by using the effective value of current, the effective values of the node voltages, and the network configuration.

In 516, the characterizing value is calculated with a closed-form mathematical expression formed according to the predefined network configuration.

In 518, the method is stopped.

Even though the invention is described above with reference to an example according to the accompanying drawings, it is clear that the invention is not restricted thereto but it can be modified in several ways within the scope of the appended claims.

The invention claimed is:

1. A testing method including:
    supplying current to at least one current path of a network of electric components of an electric circuit of a wireless device of a telecommunications system, the network being characterized with a predefined network configuration;
    measuring effective values of node voltages in at least two nodes of the at least one current path, a node representing an equipotential point of adjacent electric components; and
    deriving a characterizing value of at least one electric component of the network by using the effective value of the current, the effective values of the node voltages, and the predefined network configuration.

2. The method of claim 1, wherein the characterizing value of the at least one electric component depends on the frequency of current.

3. The method of claim 1, wherein the step of deriving includes calculating the characterizing value with a closed-form mathematical expression formed according to the predefined network configuration.

4. The method of claim 1, further including deriving the characterizing value by using the frequency associated with current.

5. The method of claim 1, further including deriving the characterizing value by using a priori characterizing value.

6. The method of claim 1, further including: measuring effective values of node voltages of an electric component which has a known characterizing value; and
    deriving the value of current by using the effective values of the node voltages of the electric component which has the known characterizing value, and the known characterizing value.

7. The method of claim 1, further including accessing the network with a standardized boundary scan test structure in order to measure the effective values of the node voltages.

8. The method of claim 1, further including accessing the network with a standardized boundary scan test structure in order to supply the current to the at least one current path.

9. The method of claim 7, wherein at least a portion of the network and at least a portion of the test structure are placed on a one and the same integrated circuit.

10. The method of claim 8, wherein at least a portion of the network and at least a portion of the test structure are placed on a one and the same integrated circuit.

11. The method of claim 1, wherein the predefined network configuration includes a delta configuration.

12. The method of claim 1, wherein the characterizing value of an electric component represents a value of an electric quantity selected from a group including: resistance, capacitance, inductance, conductance, impedance.

13. The method of claim 1, further including supplying current to a plurality current paths; and
    measuring effective values of the values of node voltages in nodes of the plurality of current paths.

14. A testing arrangement comprising:
    a current source connected to a network of electric components of an electric circuit of a wireless device of a telecommunications system, the current source for supplying current to at least one current path of the network, the network being characterized with a predefined network configuration;
    a measurement unit connected to the network, the measurement unit for measuring effective values of node voltages in at least two nodes of the at least one current path, a node representing an equipotential point of adjacent electric components; and
    a processing unit connected to the measurement unit, the processing unit for deriving a characterizing value of at least one electric component of the network by using the effective value of the current, the effective values of the node voltages, and the predefined network configuration.

15. The arrangement of claim 14, wherein the characterizing value of the at least one electric component depends on the frequency of current.

16. The arrangement of claim 14, wherein the processing unit is configured to calculate the characterizing value with a closed-form mathematical expression formed according to the predefined network configuration.

17. The arrangement of claim 14, wherein the processing unit is configured to derive the characterizing value by using the frequency associated with current.

18. The arrangement of claim 14, wherein the processing unit is configured to derive the characterizing value by using a priori characterizing value.

19. The arrangement of claim 14, wherein the measurement unit is configured to measure the effective values of node voltages of an electric component which has a known characterizing value; and
    the processing unit is configured to derive the value of current by using the effective values of the node voltages of the electric component, which has the known characterizing value, and the known characterizing value.

20. The arrangement of claim 14, further including a standardized boundary scan test structure connected to the network, the standardized boundary scan test structure for providing access to the network.

21. The arrangement of claim 20, wherein at least a portion of the network and at least a portion of the test structure are placed on one and the same integrated circuit.

22. The arrangement of claim 20, wherein the test structure is further connected to the measurement unit, the test structure configured to access nodes of the at least one current path in order to measure the effective values of the node voltages.

23. The arrangement of claim 20, wherein the test structure is further connected to the current source, the test structure configured to access the network in order to supply current to the at least one current path.

24. The arrangement of claim 14, wherein the predefined network configuration includes a delta configuration.

25. The arrangement of claim 14, wherein the characterizing value of an electric component represents a value of an electric quantity selected from a group including: resistance, capacitance, inductance, conductance, impedance.

26. A testing arrangement comprising:
    means connected to a network of electric components of an electric circuit of a wireless device of a telecommunications system, the means for supplying current to at least one current path of the network, the network being characterized with a predefined network configuration;

means connected to the network, the means for measuring effective values of node voltages in at least two nodes of the at least one current path, a node representing an equipotential point of adjacent electric components; and means connected to the means for measuring, the means for deriving a characterizing value of at least one electric component of the network by using the value of the current, the effective values of the node voltages, and the predefined network configuration.

27. A wireless device of a telecommunication system, comprising:

a current source connected to a network of electric components of an electric circuit of the wireless device, the current source for supplying current to at least one current path of the network, the network being characterized with a predefined network configuration;

a measurement unit connected to the network, the measurement unit for measuring effective values of node voltages in at least two nodes of the at least one current path, a node representing an equipotential point of adjacent electric components, the measurement unit being configured to provide the effective values for derivation of a characterizing value of at least one electric component of the network, the derivation using the effective value of the current, the effective values of the node voltages, and the predefined network configuration.

* * * * *